United States Patent [19]

Adams

[11] 4,227,549

[45] Oct. 14, 1980

[54] FLUID PRESSURE CONTROL VALVES

[75] Inventor: Frederick J. Adams, Clevedon, England

[73] Assignee: Cam Gears Limited, Hertfordshire, England

[21] Appl. No.: 930,065

[22] Filed: Aug. 1, 1978

[30] Foreign Application Priority Data

Aug. 4, 1977 [GB] United Kingdom ............... 32748/77

[51] Int. Cl.³ ............................................. F15B 13/04
[52] U.S. Cl. ................................. 137/625.69; 91/434
[58] Field of Search ...................... 91/434; 137/625.69

[56] References Cited

FOREIGN PATENT DOCUMENTS 833611 4/1960 United Kingdom ...................... 91/434

Primary Examiner—Gerald A. Michalsky

[57] ABSTRACT

A fluid pressure control valve and a steering gear including such valve. The valve including a spool assembly (100) having first (5) and second (10) spool parts and which is axially displaceable in a spool housing (101) to control flow of fluid under pressure from a pressurized port (1) to an actuating port (8) intended for communication with a ram. The first and second spool parts (5, 10) form a reaction chamber (105) the volume of which is variable. The spool parts (5, 10) can be connected by a pin and slot mechanism (108, 14) so that the chamber (105) has maximum and minimum volumes. Control means (4) acts on one (5) of the spool parts for manually displacing the spool assembly in one axial direction to open communication between said pressurized port (1) and the actuating port (8). A biasing spring (12) opposes axial displacement of the other (10) of the spool parts in the one axial direction. The reaction chamber (105) communicates with the actuating port (8) when that port (8) communicates with the pressurized port (1) and upon pressurization of the reaction chamber (105) by its communication with the pressurized port the other spool part (10) reacts against the biasing spring (12) to oppose and provide a reaction to the manual force which is applied to displace the spool assembly (100) in one axial direction.

A secondary spring (9) which is weaker than the biasing spring (12) biases the reaction chamber (105) to its expanded condition. The valve can be double acting to be displaceable from a neutral condition and in either sense of axial direction to control fluid flow to one or the opposite sides of a ram; in the neutral condition both sides of the ram may communicate through the valve with exhaust.

1 Claim, 3 Drawing Figures

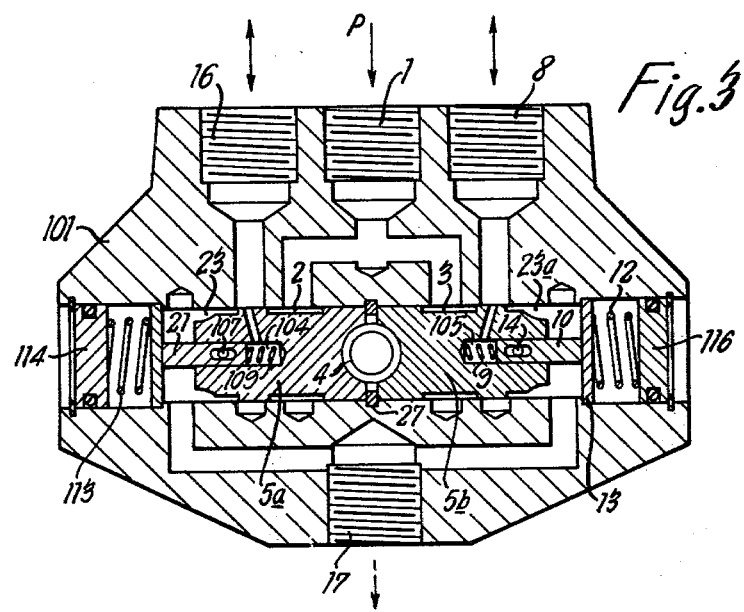

FLUID PRESSURE CONTROL VALVES

This invention relates to a fluid pressure control valve and to a power assisted steering system which includes such a valve. More particularly the invention concerns a valve which is manually operable for controlling flow of fluid under pressure to pressure operated means.

In use of a valve of the kind aforementioned it is often desirable that a reaction is applied to counter the manual force which is actuating the valve and which reaction is indicative of the fluid pressure which is being applied to the pressure operated means. This reaction is generally known in the art as "feel" and is particularly desirable, for example, in vehicle brake or clutch servo systems or in power assisted steering systems in which the control valve is utilised to determine flow of fluid (usually hydraulic) to actuate power assistance means (usually in the form of a ram) of the servo or steering system and a reaction or feed-back is provided through the system to the manual input which provides an indication of the force or effort which is being applied at a given time by the power assistance means. An example of such a control valve which provides the aforementioned "feel" characteristics is the subject of our British Pat. No. 1,456,836.

In previously proposed systems of the kind aforementioned the variation in "feel" which is fed back to the manual input is derived in response to the variation in the fluid pressure which is applied to actuate the power assistance means so that, as the fluid pressure increases, the manual effort which is required to maintain the control valve in a condition which admits fluid pressure to the power assistance means has to be increased accordingly. This has the disadvantage that considerable and uncomfortable manual effort may be required to oppose the feel reaction and maintain the power assistance or pressure operated means operative (or to increase the fluid pressure which is applied to such means) and it is an object of the present invention to provide an improved fluid pressure control valve of relatively uncomplicated structure and which can be used to provide "feel" to a manual input determining actuation of the valve for controlling flow of fluid pressure to a pressure operated means and which "feel" provides a reaction the variation of which is, in part, limited to a predetermined range of fluid pressure which is applied to actuate the pressure operated means.

According to the present invention there is provided a fluid pressure control valve comprising a spool assembly having first and second spool parts and which is axially displaceable in a spool housing to control flow of fluid under pressure from pressurised port means intended for communication with the source of fluid pressure to actuating port means intended for communication with pressure operated means;
said first and second spool parts forming a reaction chamber the volume of which is variable by relative axial displacement between said parts;
controlling means acting on one of said spool parts for manually displacing the spool assembly in a first axial direction to open communication between said pressurised port means and said actuating port means; CHARACTERISED IN THAT
biasing means is provided which opposes axial displacement of the other of said spool parts in the first axial direction, and in that the reaction chamber communicates with the actuating port means when that port means communicates with the pressurised port means and upon pressurisation of the reaction chamber by its communication with the pressurised port means the said other spool part reacts against the biasing means to oppose and provide a reaction to the manual force which is applied to displace the spool assembly in said first axial direction.

The control valve of the present invention was particularly developed for use with a power assisted steering gear and although it is to be realised that the valve has other applications, for convenience the invention will be considered hereinafter in its application to a hydraulically actuated power assisted steering gear. Further in accordance with the present invention therefore there is provided a power assisted steering system which includes a control valve as specified in the immediately preceding paragraph and in which the valve serves to control flow of fluid pressure to power assistance means associated with a steering gear or linkage.

Usually the power assistance means of a steering gear is in the form of a hydraulically actuated ram and by the present invention the control of fluid pressure to one side of the ram by way of the actuating port means is effected by axial displacement of a first spool part of the spool assembly manually in the first axial direction while the biasing means opposes axial displacement of the spool assembly as a whole and in a sense which compresses the reaction chamber (by such biasing means opposing displacement of the other or the second spool part in the first axial direction). Upon fluid pressure being admitted to actuate the ram such fluid is also open to communication with the reaction chamber. By this latter effect if there is negligible resistance to movement of the ram, only a small pressure develops in the reaction chamber and thus a small force is applied which tends to displace the first spool part in the opposite axial direction (by expansion of the reaction chamber) and in a sense to close communication between the fluid pressure source and actuating port means (and thereby the ram); consequently the effort required of the manual input to maintain open communication between the fluid pressure supply and the ram is small and corresponds to a light feel or reaction on the manual input. If, however, actuation of the ram is resisted, fluid pressure can progressively increase on the said one side of the ram and in the reaction chamber when the first spool part of the spool assembly opens communication between the fluid pressure supply and the ram by way of the actuating port means. When this fluid pressure attains a relatively high level the reaction chamber expands to displace the first and second spool parts relative to each other in a sense which tends to close communication between the fluid pressure supply and the ram. In order to maintain this latter communication open, increased manual effort is required to displace the first spool part as appropriate and this increased effort will be consistent with a heavy feel or reaction being applied to the manual input as would be expected with a high resistance to operation with the power assistance ram. At a stage which is predetermined as required, the manual input force and the fluid pressure in the reaction chamber becomes sufficiently high so that the spool assembly as a whole is displaced axially against the biasing means. At this latter stage the feel which is imparted to the manual input is determined by force of the biasing means to which the displacement of the spool assembly is subjected (rather than by the fluid pressure in the reaction chamber). Preferably the first and second spool parts are arranged so that they are capable of restricted axial displacement relative to each other (the two spool parts are conveniently coupled together by a slot and pin) so that the maximum and minimum volumes of the reaction chamber are predetermined. By this arrangement when the reaction chamber is in, and maintained at, its fully expanded condition, displacement of the spool assembly in the first axial direction is against the biasing means and the "feel" sensed by the manual control means will result solely from the effect of the biasing means and therefore such feel is no longer indicative of the fluid pressure which is supplied to the pressure operated means.

Preferably secondary biasing means is provided which reacts between the two spool parts in a sense which biases the reaction chamber to or towards an expanded condition. The secondary biasing means will be weaker than the previously mentioned biasing means (the primary biasing means) against which the spool assembly reacts and is conveniently located in the reaction chamber. During the application of manual force to axially displace the first spool part of the spool assembly in a sense to open communication between the fluid source and the pressure operated means, the secondary biasing means will act to restrain relative axial displacement between the two spool parts in the sense of resisting compression of the reaction chamber by the manually applied control force; thereby the secondary biasing means will provide a degree of "feel" to the manual control means and although such feel will not initially be indicative of fluid pressure in the valve it will provide a useful and welcome reaction to the manually applied effort until communication is opened between the fluid pressure source and both the pressure operated means and the reaction chamber. In addition, when part of the spool assembly is displaced axially intentionally to close communication between the fluid pressure source and the pressure operated means, the secondary biasing means can usefully act to assist in moving the appropriate spool part to fully close communication between the pressure operated means and the fluid pressure source. Conveniently the primary biasing means and the secondary biasing means (when provided) are in the form of mechanical springs which can be of the constant or variable rate kind.

Where it is only required that the control valve controls opening and closing of communication between a fluid pressure source and the pressure operated means (by axial displacement of the first one of the spool parts in one direction by the control means to open such communication and by axial displacement of that spool part in the opposite direction by the control means to close such communication) the spool parts of the assembly can be urged by the primary biasing means so that one of them abuts a stop on the housing at a position in which the pressure operated means is closed to communication with the fluid pressure source and from which that one of the spool parts is displaced by the manual control means axially against the biasing means to open communication between said pressure operated means and the pressure source and to provide the "feel" reaction.

In its application to power assisted steering systems it will usually be required that the valve will operate to provide a "feel" reaction for axial displacement of the spool assembly in one or the opposite senses of direction from a neutral condition of the control means whereby such axial displacement in one direction from the neutral condition will open communication between fluid pressure and the pressure operated means (say one side of a double acting ram) to provide assistance during steering towards one lock and axial displacement of the spool in the opposite sense of direction from the neutral condition will open communication between fluid pressure and the pressure operated means (the other side of the said ram) to provide power assistance in steering towards the opposite lock. This facility of the control valve for use in a power assisted steering system can be achieved by having two spool assemblies within a common housing, the respective spool assemblies being biased in opposite axial directions and into abutment with a stop in the housing corresponding to the neutral condition. During adjustment of the manual control means from the neutral condition in one mode or sense of axial direction one spool part of one of the spool assemblies only is displaced axially, initially to open communication between the pressure source and the pressure operated means (to provide power assistance in steering towards one lock) and eventually, if sufficiently high fluid pressure develops in its associated reaction chamber, against its associated primary biasing means, and during adjustment of the manual control means from the neutral condition in a second mode or the opposite sense of axial direction one spool part of the other spool assembly only is displaced axially, initially to open communication between the pressure source and the pressure operated means (to provide power assistance in steering towards the opposite lock) and eventually, again if sufficiently high fluid pressure develops in its associated reaction chamber, against its associated primary biasing means. Alternatively, the control valve for use in a power assisted steering system can have a spool assembly which is formed from three axially disposed spool parts, that is a central body part and two end parts of which each of the latter forms a reaction chamber with the spool body part and has associated therewith biasing means which reacts between each spool end part and a housing within which the spool assembly is displaceable. By this latter arrangement when the spool assembly is in its neutral condition both reaction chambers and the pressure operated means are closed to communication with the fluid pressure source and when the body part of the spool assembly is displaced axially by the manual control means in one or the opposite senses of direction from the neutral condition the fluid pressure source is opened to communication with the pressure operated means (that is with one or the other side of, say, the ram for power assistance steering). The relative displacement of the spool body part in the appropriate direction to achieve this latter communication is resisted by fluid pressure being admitted to the reaction chamber which tends to be compressed by axial movement of the body part and this fluid pressure provides the "feel", as previously discussed, to the manual control means.

When the control valve is in a power assisted steering system as above mentioned and is in its neutral condition, it is preferred that both sides of the ram are in communication through the control valve with an exhaust port or reservoir and that when either one of the sides of the ram is opened to communication through the valve with fluid pressure, the side of the ram which is not so opened to fluid pressure is maintained in communication with the exhaust port or reservoir as aforementioned. The control valve can be of the kind which is known in the art as "open centre" or "closed centre".

Embodiments of a control valve constructed in accordance with the present invention and for use in a power assisted steering system will now be described, by way of example only, with reference to the accompanying illustrative drawings in which:

FIG. 3 shows a further embodiment of control valve for a power assisted steering gear, the valve being shown in a similar axial section to that in FIGS. 1 and 2.

For convenience, and where possible throughout the following description, the same parts or members in each of the Figures have been accorded the same references.

Figure 1:
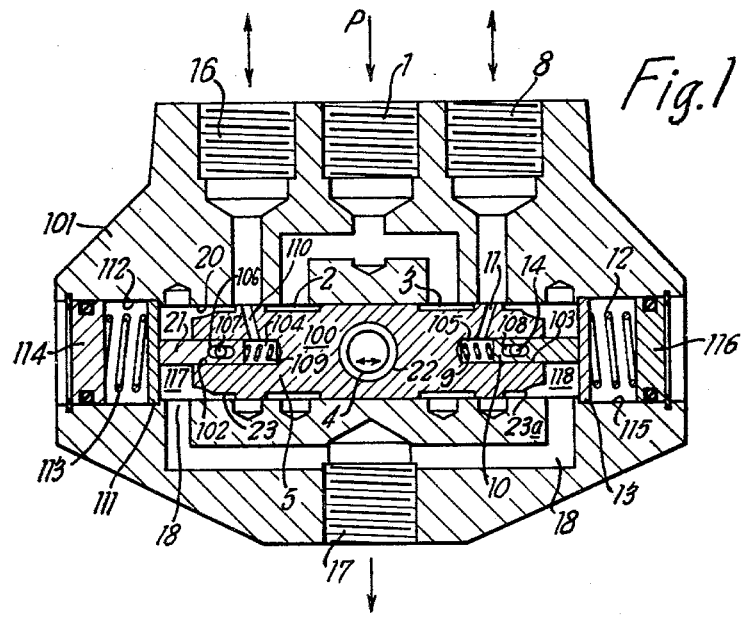
FIG. 1 is an axial section through the valve and shows the spool assembly in a neutral condition.
Figure 2:
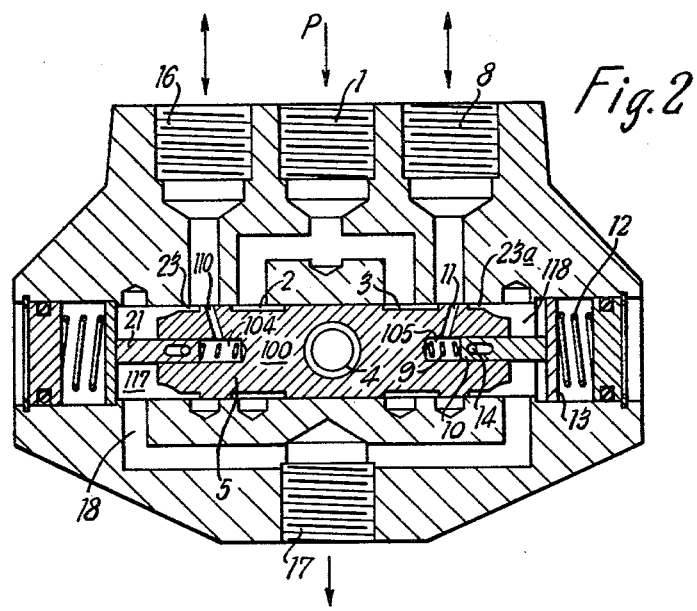
FIG. 2 is a similar section to that shown in FIG. 1 and shows part of the spool assembly displaced from its neutral condition sufficiently to effect actuation of power assistance in the steering gear.

The control valve shown in FIGS. 1 and 2 comprises a spool assembly 100 which is axially slidable in a bore 20 of a spool housing 101. The housing 101 has a pressure inlet port 1 which is intended to be connected to a source of hydraulic fluid under pressure, an exhaust or return port 17 through which hydraulic fluid emerging from the valve can exhaust or return to a fluid reservoir and two operating or actuating ports 8, 16 which respectively communicate with chambers formed on the opposite sides of a double acting ram (not shown) associated with the steering gear of a linkage (not shown) in the steering system so that the supply of fluid pressure to one or the opposite side of the ram imparts the required assistance to the steering.

The spool assembly 100 has a central or main body part 5 the ends of which are provided with axially extending blind bores 102 and 103 respectively. Mounted as a close axially sliding fit one within each of the bores 102 and 103 respectively are cylindrical auxiliary spool parts 21 and 10. Reaction chambers 104 and 105 are formed respectively between the blind end of bore 102 and the adjacent end face of spool part 21 and between the blind end of bore 103 and the adjacent end face of spool part 10. The spool part 21 has an axially extending slot 106 through which it is pinned at 107 to the spool body 5 so that the spool parts 21 and 5 can exhibit limited axial displacement relative to each other. The spool body part 5 is similarly pinned at 14 through an axially extending slot 108 in the spool part 10 so that the spool parts 5 and 10 can exhibit limited axial displacement relative to each other. The reaction chambers 104 and 105 are thus capable of expansion and contraction as predetermined by the pin and slot arrangements and within these chambers are secondary constant rated springs 109 and 9 respectively which bias the spool parts 5 and 21 and spool parts 5 and 10 axially relative to each other and towards a position of equilibrium. The reaction chamber 104 is in constant communication with a passage 110 in the spool part 5 which passage 110 communicates with port 16 and thereby with the first side of the power assistance ram. Similarly reaction chamber 105 is in constant communication with a passage 11 in the spool part 5 which passage 11 communicates with port 8 and thereby with the second side of the power assistance ram.

The outer face of spool part 21 abuts a disc 111 which is axially slidable in an enlarged end part 112 of the bore 20. The disc 111 is biased by a primary constant rated spring 113 to be urged axially into abutment with a shoulder formed between the bore parts 20 and 112. The spring 113 reacts against a sealing plug 114 retained by a circlip in the bore 112. Similarly the spool part 10 abuts against a disc 13 which is axially slidable in enlarged bore part 115 and is biased by a primary constant rated spring 12 into abutment with a shoulder formed between the bore parts 20 and 115, the spring 12 reacting against a sealing plug 116 which is retained in the bore 115 by a circlip. The springs 113 and 12 are of substantially equal strength and are considerably stronger than springs 109 and 9 (of which the latter are of substantially equal strength). The springs 113, 109, 9 and 12 bias their respectively associated parts so that the spool body part 5 is centrally located at a neutral condition in the bore 20 in which passages 110 and 11 communicate with ports 16 and 8 respectively. The spool body part 5 has two axially spaced annular recesses 2 and 3 which are in constant communication with fluid pressure inlet port 1. With the spool assembly in its neutral condition the recesses 2 and 3 communicate solely with the port 1 but upon axial displacement of the spool part 5 from its neutral condition leftwardly or rightwardly in the drawing, recess 2 or recess 3 will open communication with port 16 or with port 8 respectively. The ends of the spool body part 5 are provided with annular rebates or shoulders 23 and 23a arranged so that with the spool part 5 in its neutral condition one shoulder 23 opens communication between port 16 and a chamber 117 formed in the spool cylinder between disc 111 and the adjacent end face of spool part 5 while the other rebate 23a communicates between port 8 and a chamber 118 formed in the spool cylinder between disc 13 and the opposing end face of spool part 5. Both chambers 117 and 118 are in constant communication with the exhaust or return port 17 through passages 18 in the housing 101.

In the present embodiment the valve is of the "closed centre" kind so that there is not a continuous flow of hydraulic fluid through the valve; therefore in use of the valve in a power assisted steering gear the port 1 will usually be coupled to the output from an hydraulic accumulator (not shown). In addition the spool assembly 100 is intended to be axially displaced in one or the opposite direction from its neutral condition by manual effort and this is conveniently achieved by use of a rocking or pivoted lever 4 which engages within an aperture 22 of the spool body part 5. In response to a manual steering effort the lever 4 is moved leftwardly or rightwardly in the drawing to displace the spool assembly and operate the power steering system in a manner which will now be described with reference to FIG. 2.

When the spool body part 5 is in its neutral condition (which may be regarded as consistent with no alteration being effected in vehicle steering) both ports 8 and 16 and thereby the opposite sides of the power assistance ram communicate with return or exhaust port 17 by way of rebates 23, chambers 117, 118 and passages 18. When an alteration in steering is effected to cause the lever 4 to be displaced, for example, rightwardly in FIG. 1, such movement of the lever 4 causes the spool body part 5 to be displaced rightwardly and to compress biasing spring 9 (spring 9 being weaker than biasing spring 12) between spool parts 5 and 10. Consequently, initial displacement of the spool part 5 may be regarded as being resisted solely by the spring 9 to provide a measure of constant "feel" to the manual displacement of lever 4.

During the aforementioned displacement of the spool body part 5 rightwardly to the position shown in FIG. 2 communication closes between the port 8 and the rebate 23a and the annular recess 3 eventually opens communication between the pressure port 1 and both the port 8 (to one side of the ram) and passage 11 (to the reaction chamber 105). During this latter movement port 16 and thereby the other side of the power assistance ram is increasingly opened by way of rebate 23 to communication with the return port 17. The fluid pressure in the reaction chamber 105 is thus substantially the same as fluid pressure actuating the power assistance ram through port 8 and this fluid pressure acts in the reaction chamber in a sense to expand the latter between the opposing forces exerted by the manual control lever 4 and the biasing spring 12. Consequently, the fluid pressure tending to expand the reaction chamber 105 is directly indicative of the fluid pressure actuating the ram and the pressure reaction will provide the desired feel on the control lever 4. By this arrangement therefore, if there is negligible resistance to a steering manoeuvre so that the ram can move relatively freely the fluid pressure in the reaction chamber 105 will be relatively small; thus the manual force necessary to retain open the annular recess 3 to the port 8 against the fluid pressure in the reaction chamber will be relatively small thereby providing a "light feel" as would be expected. However, if there is a high resistance to operation of the ram the pressure in port 8 and therefore in the reaction chamber 105 will have to increase sufficiently to overcome such resistance. Therefore as annular recess 3 increasingly opens to communication with port 8 to increase the fluid pressure at that port (and in the reaction chamber) the effect of such pressure in the reaction chamber is to urge the spool body part 5 leftwardly in the drawings and thus an increase in manual effort is required to maintain open the communication between the fluid pressure port 1 and port 6 so a "heavy feel" is provided as would be expected.

In the event that the resistance to movement of the ram is sufficiently high to cause the fluid pressure in the reaction chamber 105 to further increase, the reaction chamber 105 will not be able to expand further due to the pin 14 bottoming in slot 108 and the necessary increase in manual force is effected on the control lever 4 to displace the body part 5 rightwardly (and thereby open annuar recess 3 even further to communication with port 8) such displacement of the spool resulting in compression of biasing spring 12 between disc 13 and plug 116 (as shown in FIG. 2). Consequently the compression of spring 12 will provide a reaction on the control lever 4 and a "feel" which is substantially constant irrespective of variations in fluid pressure in the port 8 at the relatively high range of such pressure.

When the steering manoeuvre is completed and torque is removed from the manual control lever 4, the spool body part 5 will be displaced leftwardly under the effect of fluid pressure in the reaction chamber 105 and the effect of biasing springs 9 and 12 and the disc 13 will be displaced leftwardly into abutment with the shoulder in the housing. As the annular recess 3 progressively closes to communication with the port 8 the pressure in chamber 105 will decrease accordingly and the final closing of communication between the recess 3 and port 8 is achieved by axial movement of the spool body part 5 leftwardly under the biasing effect of spring 9 so that the valve reverts to the condition shown in FIG. 1 and rebate 23a again opens port 8 to communication with the exhaust port 17.

It will be apparent to persons skilled in the art that operation of the valve and consequential actuation of the power assisted steering system which results from displacement of the manual control lever 4 and spool body part 5 leftwardly in the drawings to pressurise the ram through port 16 is achieved in substantially the same manner as that previously described and as such need not be discussed herein.

The structure of the valve in the embodiment shown in FIG. 3 is substantially the same as that shown in FIGS. 1 and 2 with an important distinction that the spool body part is formed by two separate spool sections 5a and 5b which are independently slidable in the spool cylinder 20. The spool sections 5a and 5b are, in the neutral condition of the valve, located by the biasing effect of the springs 113, 109, 9 and 12 in abutment with a flange 27 which extends radially inwardly of the spool cylinder and is located axially between the spool sections 5a and 5b. The flange 27 is conveniently formed by an internal circlip. From FIG. 3 it will be seen that if the manual control lever 4 is displaced rightwardly in the drawing it will engage and displace the spool section 5b accordingly. The effect of this latter displacement to control flow of fluid pressure to the port 8 is identical to that previously described for rightward displacement of the spool body part 5 in the FIG. 1 embodiment with the exception that the spool section 5a remains stationary and in abutment with the flange 27 (so maintaining constant the route by which port 16 communicates with the return port 17 and thereby exhaust by way of rebate 23). It will be apparent that if the manual control lever 4 is displaced leftwardly in FIG. 3 then spool section 5b remains stationary and in abutment with the flange 27 while spool section 5a moves leftwardly to control flow of fluid pressure to the port 16.

If required biasing springs 9 and 109 can be omitted and the spool part 5 or spool parts 5a and 5b can be biased to the neutral condition by spring biasing in chambers 117, 118.

I claim:

1. A fluid control valve comprising a housing, an inlet port in said housing adapted to be connected with a supply of pressurized fluid, a drain port in said housing adapted to be connected with a reservoir of low pressure fluid, first and second outlet ports in said housing adapted to be connected with a fluid actuated motor, a bore in said housing, a spool asssembly slidable in said bore in either axial direction from a neutral position, first and second end walls closing opposite ends of said bore, said spool assembly cooperating with said bore to define first and second end chambers at opposite ends of said spool assembly and bore, passage means for establishing fluid communication between each of said end chambers and said drain port regardless of the axial position of said spool assembly in said bore whereby fluid in said first and second end chambers is always at the same pressure as said drain port, passage means for establishing fluid communication between said first and second outlet ports and said first and second end chambers when said spool assembly is in said neutral position to connect said first and second outlet ports in fluid communication with the reservoir through said first and second end chambers, said spool assembly comprising a main spool part and first and second auxiliary spool parts, said main spool part and said first auxiliary spool part cooperating to define a first variable volume reaction chamber and said second auxiliary spool part and said main spool part cooperating to define a second variable volume reaction chamber, said first auxiliary spool part being axially movable relative to said main spool part to vary the volume of said first reaction chamber upon relative axial movement between said main spool part and first auxiliary spool part, said second auxiliary spool part being axially movable relative to said main spool part to vary the volume of said second reaction chamber upon relative axial movement between said main spool part and said second auxiliary spool part, said first auxiliary spool part extending axially outwardly from a first end surface of said main spool part into said first end chamber, said first auxiliary spool part and said first end surface of said main spool part being exposed to the reservoir pressure in said first end chamber when said spool assembly is in the neutral position and when said spool assembly is moved axially from the neutral position, said second auxiliary spool part extending axially outwardly from a second end surface of said main spool part into said second end chamber, said second auxiliary spool part and said second end surface of said main spool part being exposed to the reservoir pressure in said second end chamber when said spool assembly is in the neutral position and when said spool assembly is moved axially from the neutral position, first limiting means for limiting relative axial movement between said main spool part and said first auxiliary spool part and second limiting means for limiting relative axial movement between said main spool part and said second auxiliary spool part, said first and second limiting means establishing maximum and minimum volumes for said first and second variable volume reaction chambers, respectively, said spool assembly including passage means communicating fluid pressure between first outlet port and said first reaction chamber and passage means communicating fluid pressure between said second outlet port and said second reaction chamber, spring means for applying a biasing force in its entirety tending to retain said spool assembly in the neutral position, said spring means including a first spring element coacting between said main spool part and a first end portion of said first auxiliary spool part to urge said first auxiliary spool part toward a position in which said first variable volume reaction chamber has its maximum volume, a second spring element coacting between said main spool part and a first end portion of said second auxiliary spool part urging said second auxiliary spool part toward a position in which said second variable volume reaction chamber has its maximum volume, a third spring element coacting between said first end wall and a second end portion of said first auxiliary spool part to apply a portion of said biasing force to said first auxiliary spool part and a fourth spring element coacting between a second end portion of said second auxiliary spool part and said second end wall to apply a portion of said biasing force to said second auxiliary spool part, said spool assembly being urged toward the neutral position under the influence of only biasing forces applied to said first and second auxiliary spool parts and independently of the application of force to said main spool part, a first disc interposed between said second end portion of said first auxiliary spool part and said third spring element for transmitting forces therebetween, a second disc interposed between said second end portion of said second auxiliary spool and said fourth spring element for transmitting forces therebetween, said first and second discs being axially slidable in said bore, and means for sliding said spool assembly in a first axial direction in said bore to close communication between said first outlet port and said drain port and to establish communication between said inlet port and said first outlet port, the pressure in said first outlet port being communicated to said first reaction chamber and tending to expand said first reaction chamber against the force of said third spring element coacting between said first end wall and said first auxiliary spool part and in a second axial direction in said bore to close communication between said second outlet port and said drain port and to establish communication between said inlet port and said second outlet port, the pressure in said second outlet port being communicated to said second reaction chamber and tending to expand said second reaction chamber against the force of said fourth spring coacting between said second end wall and said second auxiliary spool part, said bore including surface means for limiting axial movement of said first disc in said second direction and surface means for limiting axial movement of said second disc in said first direction.

* * * * *

UNITED STATES PATENT AND TRADEMARK OFFICE
CERTIFICATE OF CORRECTION

PATENT NO. : 4,227,549
DATED : October 14, 1980
INVENTOR(S) : Frederick J. Adams It is certified that error appears in the above-identified patent and that said Letters Patent are hereby corrected as shown below:

Column 8, line 50, after the word "assembly" insert --axially--.

Signed and Sealed this

Twenty-seventh Day of January 1981

[SEAL]

Attest:

RENE D. TEGTMEYER

Attesting Officer

Acting Commissioner of Patents and Trademarks